United States Patent [19]

Sugioka

[11] 4,033,004

[45] July 5, 1977

[54] BOOKBINDING MACHINE

[75] Inventor: Yasuji Sugioka, Kyoto, Japan

[73] Assignee: Taiyo Seiki Co., Ltd., Kyoto, Japan

[22] Filed: Mar. 29, 1976

[21] Appl. No.: 671,262

[30] Foreign Application Priority Data

Apr. 7, 1975 Japan ........................ 50-47219[U]

[52] U.S. Cl. ...................................... 11/1 AD; 11/3

[51] Int. Cl.² ............................................ B32B 1/04

[58] Field of Search .................. 11/1 R, 3, 4, 1 AD; 156/447 B, 216

[56] References Cited

UNITED STATES PATENTS

| | | | |
|---|---|---|---|
| 3,101,493 | 8/1963 | Carstens | 11/4 |
| 3,804,694 | 4/1974 | Blair | 156/477 B |

*Primary Examiner*—Lawrence Charles

*Attorney, Agent, or Firm*—Christensen, O'Connor, Garrison & Havelka

[57] ABSTRACT

A bookbinding machine wherein a book comprising a plurality of sheets of paper or the like to be bound together is clamped by a clamping device at a first position and the clamping device with the book is reciprocated between the first position and a second position. In the course of reciprocation adhesive is applied to one edge surface or back of the clamped book. When the clamping device has been returned to the first position after reciprocation, a cover sheet on a supporting plate is applied onto the back of the book by raising the supporting plate, which is then moved away from below the clamping device after application of the cover sheet to the back of the book so that the book may be easily taken out of the machine from below the clamping device by gravitation or otherwise.

9 Claims, 9 Drawing Figures

BOOKBINDING MACHINE

This invention relates to a bookbinding machine and, more particularly, to an apparatus for binding a plurality of sheets of paper or the like material into a book by applying adhesive to one edge surface or back thereof.

In one known bookbinding machine, a plurality of piled sheets of paper to be bound into a book is passed over a stationary adhesive applicator, which applies adhesive to one edge surface or back of the piled sheets. A cover applicator which supports a sheet of paper to be attached to the bound sheets as a cover receives the bound sheets that have passed the adhesive applicator and is moved so as to press the cover onto the back of the bound book where the adhesive has been applied.

In this type of bookbinding machine, the sheets of paper are clamped together at one side of the adhesive applicator and the cover sheet is applied to the bound sheets at the opposite sides of the applicator. A single worker or operator would have to walk repeatedly from one to the other side of the applicator, which would cause considerable physical fatigue to the worker.

In this type of prior art bookbinding machine, the cover applicator is moved over a predetermined fixed distance to apply a cover sheet to the bound piled sheets of paper. In other words, the distance between the upper surface of the cover applicator on which a cover sheet is placed and the adhesive-applied edge or back of the bound sheets or book is fixed. On the other hand, cover sheets having different thicknesses are applied to different types of books. If the cover sheet to be applied is thicker than a normal one, it would be applied to the back of a book with an unnecessarily stronger pressure than a cover sheet having a normal thickness. On the contrary, if the cover sheet is thinner than normal, it could not be applied to the back of the book with sufficient pressure, so that it would be likely to be detached from the book afterwards.

Accordingly, it is one object of the invention to provide a bookbinding machine which is capable of performing bookbinding operation in a relatively simple manner.

Another object of the invention is to provide a bookbinding machine which is capable of applying a cover sheet to a book without fail.

Another object of the invention is to provide a bookbinding machine which is provided with a clamping device from which the book can be easily taken out after application of a cover sheet thereto.

Still another object of the invention is to provide a bookbinding machine which can be easily handled by a single worker who need not walk to-and-fro around the machine.

The invention with its above and other objects, features and advantages will be described in detail with reference to the accompanying drawings, wherein.

Figure 1:
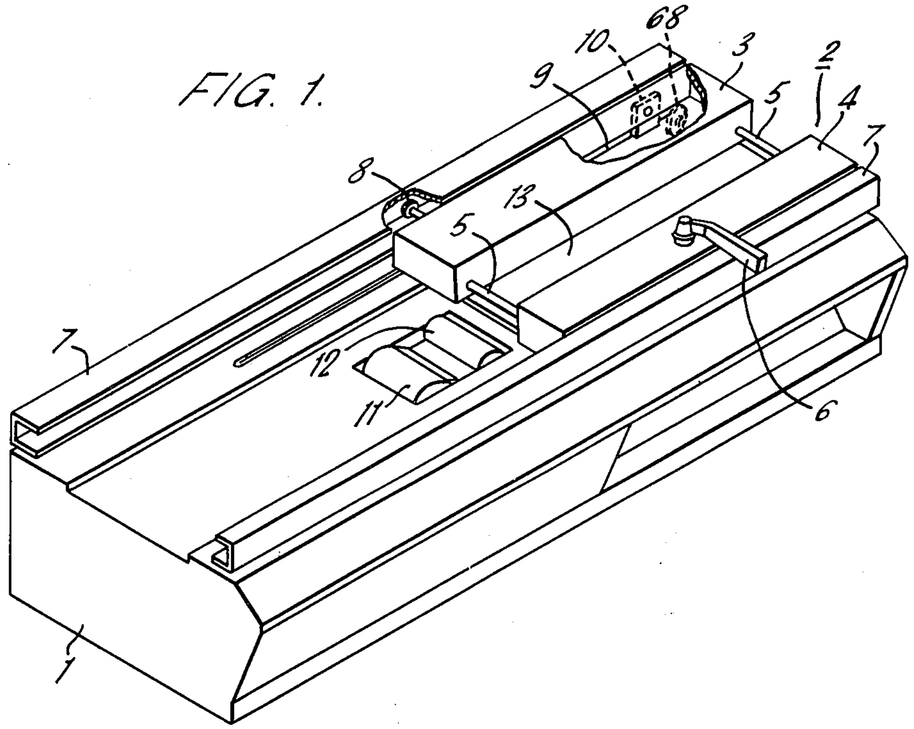
FIG. 1 is a perspective view, partly broken-away, of the bookbinding machine of the invention.

In FIG. 1, there is shown a housing 1 on the upper surface of which a clamp carriage 2 is slidable along the length of the housing. The clamp carriage 2 has a pair of clamping members 3 and 4 which are movable toward and away from each other along a pair of guide rods 5.

A plurality of piled sheets to be bound together (which will be referred to as a book hereinafter) are held standing on its one edge surface or back between the pair of clamping members 3 and 4, which are then pressed against the opposite sides of the book by operating a lever 6. The sheets are thereby clamped between members 3 and 4.

The clamp carriage 2 is moved over the upper surface of the housing 1. To this end the clamp carriage is provided with rollers 8 which roll in and along a pair of spaced parallel guide rails 7 extending longitudinally along the opposite lateral sides of the housing. The clamping carriage is connected by means of a connector 10 to a chain 9 which is driven in a manner to be described later. When the chain 9 is driven, the clamp carriage 2 is moved along the guide rails 7.

An adhesive applicator includes a pair of rollers 11 and 12 which are disposed in the path of movement of the clamp carriage, so that as the book carried by the clamp carriage 2 passes over the rollers 11 and 12 with the back of the book in contact with the rollers 11 and 12, the adhesive carried on the circumferential surface of the roller 11 is applied to the back of the book.

When the application of the adhesive has been completed, the clamp carriage 2 is moved in the opposite direction back to its original position along the same path as it previously followed. When the carriage has returned to its original position, a cover sheet 13 is applied to the back of the book.

The cover sheet 13 is placed at a predetermined position below the clamp carriage 2 before it started its operating movement. When the book has returned to its original position in the above-mentioned manner, the cover sheet is moved upwardly so as to be attached onto the back of the book where adhesive has already been applied. The book to which the cover has been affixed is taken out downwardly through a space provided below the clamp carriage 2.

The general layout and operation of the machine of the invention has been described above. The details will now be given with reference to FIG. 2 and the other drawing figures.

Figure 3:
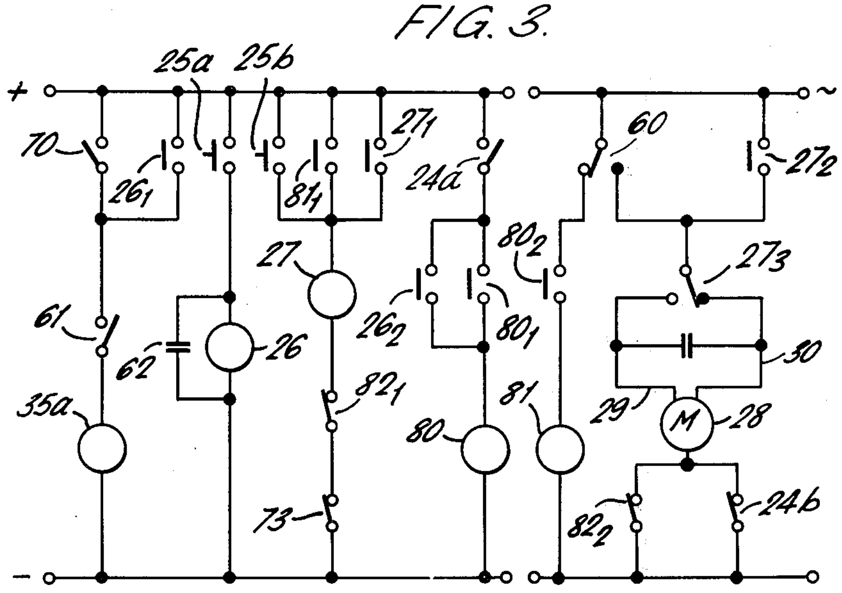
FIG. 3 is a diagram showing an electrical control circuit of the machine of the invention.
Figure 2:
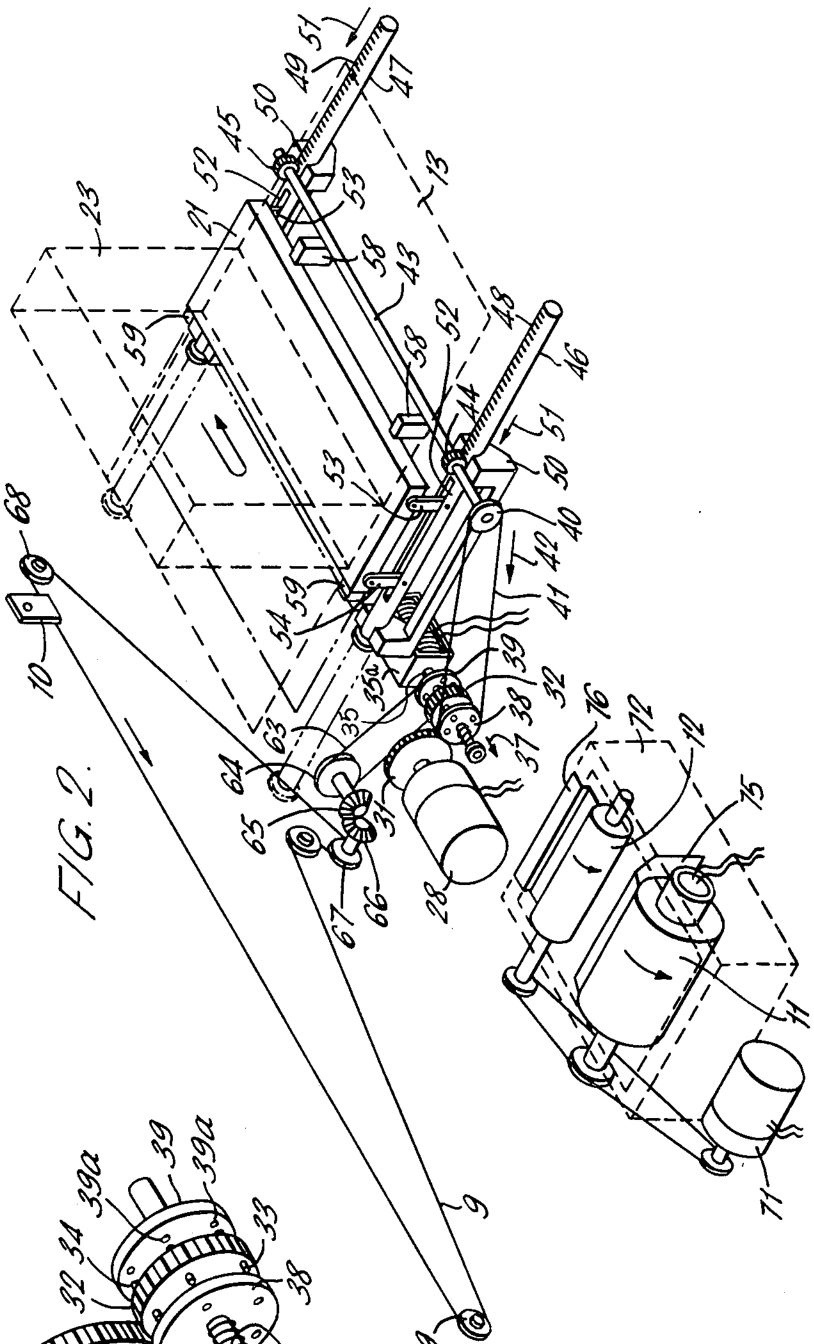
FIG. 2 is a perspective view of the interior mechanism of the machine shown in FIG. 1.
Figure 4:
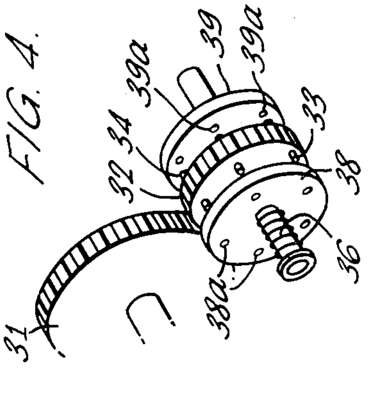
FIG. 4 is an enlarged view of a portion of FIG. 2.

FIG. 2 shows the interior mechanism of the housing 1, and FIG. 3 shows a circuit diagram for controlling the operation of the mechanism.

Referring to these two figures, a cover sheet supporting device includes a supporting plate 21 provided below the clamp carriage 2. A cover sheet 13 to be applied to the book is laterally inserted so as to be placed at a predetermined position on the surface of the plate 21.

A book 23 comprising a plurality of sheets to be bound is placed on the support plate 21 so as to stand on its one edge or back in contact with the cover sheet 13 thereon. Then the book is clamped between the clamping members 3 and 4.

By this clamping operation a switch 24*a* is closed and a switch 24*b*, opened. When start switches 25*a* and 25*b* (which are ganged) are then closed, relays 26 and 27 are energized. Upon energization of the relay 27, relay $27_1$ are closed to hold the relay 27 energized, relay contacts $27_2$ are closed, and the contacts $27_3$ are caused to move from the position illustrated in FIG. 3 to the other position, whereupon current is supplied to a motor 28 through a line 29, so that the motor begins to rotate.

To the output shaft of the motor 28 there is fixed a gear 31 which meshes with a gear 32. The gear 32 and its shaft are axially movable and a plurality of pins 33 and 34 are fixed on the opposite side surfaces of the gear 32. The gear shaft has its one end connected to a plunger 35 of a solenoid 35*a* and its opposite end urged by a spring 36 in the direction of an arrow 37.

A pair of sprocket wheels 38 and 39 are rotatably mounted on the gear shaft at the opposite sides of the gear 32. The sprocket wheel 38 is provided with a plurality of holes 38*a* into which the pins 33 can engage, and the sprocket wheel 39 is provided with holes 39*a* into which the outer tapered end of the pins 34 can engage.

A chain 41 extends between the sprocket wheel 38 and a sprocket wheel 40. Upon initial rotation of the motor 28, the chain 41 is driven in the direction of an arrow 42 since the gear 32 is urged by the spring 36 so far that its pins 33 engage in the holes 38*a* in the sprocket wheel 38 for transmission of rotation of the gear 32 to the sprocket wheel 38.

The sprocket wheel 40 is fixed to a shaft 43 which is rotatably supported. A pair of pinion gears 44 and 45 are fixed to the shaft 43 so that the upon running of the chain 41 the pinion gears 44 and 45 are rotated through rotation of the shaft 43.

Below the clamp carriage 2 a pair of spaced parallel guide rods 46 and 47 are provided so as to be axially movable, and a rack 48, 49 is formed along each of the guide shafts 46 and 47 so as to mesh with the pinion gears 44 and 45, respectively.

Upon rotation of the shaft 43, the guide shafts 46 and 47 are moved axially on bearing guides 50 in the direction of an arrow 51. The guide shafts 46 and 47 are formed on their respective surfaces with an axial groove 52, in which a pair of links 53 and 54 have their respective lower ends pivoted. The upper ends of the links 53 and 54 are pivoted to each end of the cover sheet supporting plate 21.

A pair of stoppers 58 are provided adjacent one lateral side of the supporting plate 21 which is close to the shaft 43. Another pair of stoppers 59 are provided at fixed positions at the opposite lateral side of the plate 21.

Figure 5A:
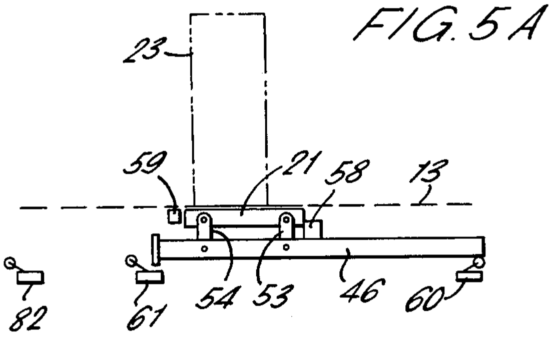
FIGS. 5A, 5B and 5C are side views showing different relative positions of the cover applicator to a book.
Figure 5B:
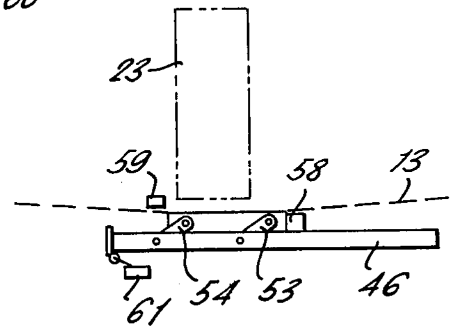
Figure 5C:
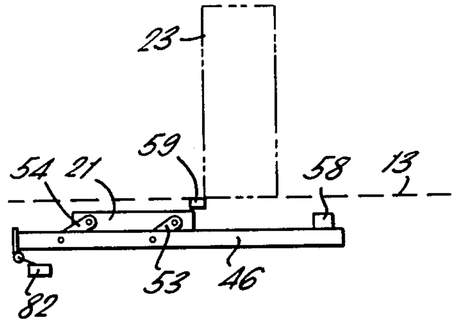

When the guide shafts 46 and 47 are moved in the direction of the arrow 51, the lower pivoted ends of the links 53 and 54 are moved in the same direction. However, with the stoppers 59 preventing the plate 21 from being moved, the links 53 and 54 are tilted about the lower ends in the direction opposite to the direction of movement of the guide shafts 46 and 47. This operation is illustrated in FIGS. 5A to 5C. FIG. 5A shows the condition shown in FIG. 2, wherein the links 53 and 54 stand upright. The links are then tilted as the guide shafts 46 and 47 are moved so that the cover sheet supporting plate 21 is lowered to a level a little below the previous level.

Since the sheets to be bound have previously been clamped in the carriage 2 above, upon lowering of the supporting plate 21 a gap or space is formed between the back of the book 23 and the cover sheet 13 on the plate 21 as shown in FIG. 5B.

Upon axial movement of the guide shaft 46, a switch 60 which has been depressed by the shaft 46 is released so that the contacts of switch 60 move from the position shown in FIG. 3 to the opposite position and upon arrival of the guide shaft 46 at a position where the cover sheet supporting plate 21 has been lowered, a switch 61 is depressed to close its contact.

The relay 26 has its contact $26_1$ closed upon previous closing of the switch 25*a*, and even when the switch 25*a* is opened, the contact $26_1$ is kept closed for a period of time predetermined by the discharge time constant of a capacitor 62 and then opened after lapse of the time. The arrangement is such that the contact $26_1$ is kept closed at the time when the switch 61 is closed, so that at this time the solenoid 35*a* for the plunger 35 is energized. Upon energization of the solenoid, the gear 32 is moved toward the sprocket wheel 39 until the pins 34 engage holes 39*a*, with the pins 33 having been disengaged from the holes 38*a*. As a result, the sprocket wheel 39 is rotated by the motor 28, while the rotation of the sprocket wheel 38 ceases. Upon rotation of the sprocket wheel 39, a sprocket wheel 67 is rotated through a chain 63, a sprocket wheel 64, and gears 65 and 66.

In the housing 1 sprocket wheels 68 and 69 are spaced apart from each other a distance corresponding to the distance to be travelled by the clamp carriage 2, with an endless chain 9 passing about the sprocket wheels 67 to 69. Upon rotation of the sprocket wheel 67, the chain 9 is moved so as to move the clamp carriage 2, whereupon the pressure that the clamp carriage 2 has until then been applying on a switch 70 is removed so that the contact of the switch is closed. This keeps the solenoid 35*a* energized despite opening of the contact $26_1$ caused by deenergization of the relay 26.

The rollers 11 and 12 of the adhesive applicator are rotated by a motor 71 in the same direction as that of the initial movement of the clamp carriage. The lower halves of the circumferential surfaces of the rollers are positioned in an adhesive container 72. The adhesive is of a hot-melt type and kept molten by means of an electric heater not shown but provided in the container. As the clamp carriage 2 is moved, the adhesive is applied onto the back of the book 23 clamped by the carriage.

About the time the rear end of the back of the book 23 has passed the roller 11, a switch 73 is pressed by the clamp carriage 2 so that its contact is opened, whereupon the relay 27 is deenergized to move the relay contacts $27_3$ to the position shown. With the switch 60 having been already changed over to the other side, electric current is supplied to the motor 28 through a line 30, so that the motor 28 is rotated in the opposite direction. This causes the clamp carriage to move back toward its original position. The switch 73 is then again closed. In the course of return movement of the clamp carriage, the back of the book 23 is again contacted by the rollers 11, 12 so that adhesive is again applied to the back of the book.

Figure 6A:
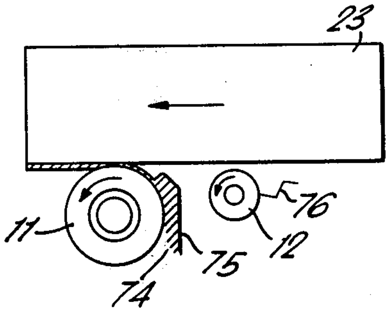
FIGS. 6A and 6B are side views showing the adhesive applicator with a book in different operative positions.
Figure 6B:
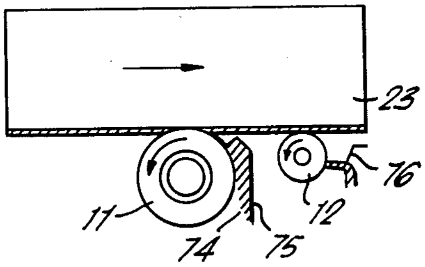

The manner in which adhesive is applied twice onto the back of the book is shown in FIGS. 6A and 6B. The first application is conducted as shown in FIG. 6A, wherein the adhesive 74 carried upward on the surface of the roller 11 is spread by a doctor blade 75 to a uniform layer about 1 mm thick. The layer of adhesive is frictionally applied onto the back of the back 23 as the back comes into contact with the circumferential surface of the roller 11. Then the book is moved in the opposite direction or backward so that the adhesive on the roller 11 is applied to the back of the book for a second time. At this second time, the roller 11 rotates in the opposite direction to the moving direction of the book 23, so that more adhesive than in the previous application is applied to the back of the book.

The roller 12 then pushes the adhesive securely onto the back of the book while removing excess adhesive therefrom. A scraper 76 scrapes the adhesive off the circumferential surface of the roller 12 so that the roller 12 may always have a clean surface to come into contact with the back of the book and thereby present a clean surface to the back of the book for removing excess adhesive therefrom. In this manner the sheets of paper are glued together and are ready to receive the application of cover 13 to form a bound book.

When the clamp carriage 2 has come back to the original position, the switch 70 is again pressed to open its contact, whereupon the solenoid 35*a* is deenergized to restore the plunger 35 to its original position so that the spring 36 urges the gear 32 in the direction of the arrow 37 away from the sprocket wheel 39, thereby stopping the chain 9 and consequently the clamp carriage 2. At the same time the gear 32 is again brought into engagement with the sprocket wheel 38 by reason of pins 33 engaging holes 38*a*, so that the chain 41 is again moved. At this time, however, since the motor 28 is rotated in the direction opposite to the direction in which the motor was previously rotated, the chain 41 runs in the direction opposite to the arrow 42, so that the cover sheet supporting plate 21 is moved back toward its original position. During this movement plate 21 abuts the stopper 58 which causes the plate 21 to rise, with the links 53 and 54 being brought back to their original upright positions as shown in FIG. 5A.

When the cover sheet supporting plate 21 has the thus been raised, the cover sheet 13 is pressed against and adhered to the adhesive-applied back of the book 23 that has already been brought back to the original position. Regardless of the thickness of the cover sheet 13, it can be applied to the back of the book with a constant pressure sufficient to adhere the cover sheet to the back.

Needless to say, when the plate 21 returns to the original position as shown in FIG. 5A, the switch 60 is depressed so that its contacts assume the position shown in FIG. 3, thus opening the supply circuit to the motor 28 so that it stops its rotation.

Since the switch 24*a* has already been closed by the clamping operation of the clamp carriage 2, and since the relay 26 was previously energized to have its contact $\mathbf{26_2}$ closed, a relay 80 is energized and one contact $\mathbf{80_1}$ of relay 80 closes to keep the relay energized and another contact $\mathbf{80_2}$ also closes. In this condition, when the switch 69 is depressed as previously mentioned to have its contacts positioned as shown in FIG. 3, a timer relay 81 is actuated.

This timer relay 81 is so designed that upon lapse of a predetermined period of time after actuation (e.g., about 5 seconds during which period the cover sheet 13 is applied to the book 23), its contact $\mathbf{81_1}$ is closed, so that the relay 27 is again energized, with the contact $\mathbf{27_1}$ being closed to keep the relay 27 energized.

Upon energization of the relay 27, the motor 28 is rotated in the same direction as in the initial operation of the machine to move the cover supporting plate 21 to the position shown in FIG. 5B. At this time, however, since the switch 70 has already been opened, the solenoid 35*a* is never energized despite the switch 61 having been depressed, so that the plate 21 continues to move to the position shown in FIG. 5C, where the plate 21 depresses the switch 82 to open its contacts $\mathbf{82_1}$ and $\mathbf{82_2}$. Upon opening of the contact $\mathbf{82_1}$ the relay 27 is deenergized and upon opening of the contact $\mathbf{82_2}$ the rotation of the motor 28 is stopped.

Then the clamping lever 6 of the clamp carriage 2 is loosened to release the clamp on the book 23, whereupon the book gravities through an opening or space formed therebelow by reason of the displacement of the cover sheet supporting plate 21 from its initial position below the clamp carriage. If the arrangement is such that the opening or space is of a dimension a little larger than the area of the back of the book, the cover sheet 13 is bent to lie on the opposite (that is, the front and rear) surfaces of the book as the book gravitates through the opening.

The book 13 may not only be caused to gravitate but it may also be positively pulled or pushed downwardly. In either case, at this time the cover sheet supporting plate 21 has already been removed from below the book 23 as shown in FIG. 5C, nothing interferes with the operation of removing the book from the carriage 2. Since the book 23 is taken out from below the clamp carriage 2, the clamp carriage does not obstruct the operation of taking out the book even though the cover sheet underlies the clamp carriage. If the bound book were to be taken out from above the clamp carriage 2, the clamp carriage would have to be removed from its position over the cover sheet. Such inconvenience is not encountered in the machine of the invention.

When the clamp lever 6 is loosened for removal of the bound book, the switch 24*b* is closed so that the motor 28 is energized through the switch 60, the contact $\mathbf{27_3}$ and the line 30 to rotate again in the opposite direction to restore the cover sheet supporting plate 21 to the position shown in FIG. 5A, where the switch 60 is depressed so that its contacts assume the position shown in FIG. 3 to stop the motor 28 for restoration of the machine to the original condition.

What I claim is:

1. A bookbinding machine comprising: a clamp carriage including means for clamping a book comprising a plurality of piled sheets of paper or the like to be bound; means for reciprocating said clamp carriage along a predetermined path; adhesive applicator means disposed in said path for applying adhesive to the back of said book as it is moved along said path; and cover sheet supporting means for adhering a cover sheet onto said back when said book has returned to its original position after reciprocal movement along said path.

2. The bookbinding machine of claim 1, wherein said cover sheet supporting means includes a plate disposed below said clamp carriage at the original position thereof, with said cover sheet being placed on the upper surface of said plate, and said book is initially clamped by said clamp means with its back in contact with the upper surface of said cover sheet on said plate.

3. The bookbinding machine of claim 2, wherein said plate of said cover sheet supporting means is moved out of contact with the back of said book before said clamp carriage is reciprocated along said path, and is restored to its original position when said clamp carriage has returned to its original position after reciprocation along said path.

4. The bookbinding machine in claim 1, wherein said cover sheet supporting means is removed away from below said clamp carriage after said supporting means has completed application of said cover sheet onto the back of said book clamped by said clamp carriage that has returned to its original position after reciprocal movement along said path, so that said book released from said clamp carriage may be easily taken out from below said clamp carriage.

5. The bookbinding machine of claim 2, wherein said plate of said cover sheet supporting means is disposed at a first position where said cover sheet on said plate is in contact with the back of said book before said clamp carriage is reciprocated along said path, and said plate is moved to a second position where said cover sheet is out of contact with the back of said book at the start of reciprocal movement of said clamp carriage, and when said clamp carriage has returned to its original position after said reciprocal movement thereof, said plate is moved back to said first position so that said cover sheet is applied onto the back of said book clamped by said clamp means to be firmly adhered thereto by the adhesive that has been applied to said back, and after completion of application of said cover sheet onto the back of said book, said plate is moved away from below said clamp carriage so as not to obstruct said book being taken out from below said clamp carriage.

6. The bookbinding machine of claim 2, wherein said cover sheet supporting means further includes a pair of spaced horizontal guide rods which extend perpendicularly to the direction of movement of said clamp carriage and which are axially movable, a pair of links having their lower ends pivoted to each said guide shafts and their upper ends pivoted to each of the opposite ends of said plate, so that said plate is movable between relatively raised and lowered levels, and means for axially moving said guide rods thereby to move said plate at said lowered position away from below said carriage after said cover sheet on said plate at said raised position has been applied to the back of said book.

7. The bookbinding machine of claim 1, wherein said adhesive applicator means includes a roller rotatable in the same direction as that of the movement of said clamp carriage and disposed in said path so that the back of said book clamped by said clamp carriage is brought into contact with said roller in both ways of the reciprocal movement of said clamp carriage for application of the adhesive on said roller to the back of said book.

8. The bookbinding machine of claim 1, wherein said adhesive is of a hotmelt type.

9. The bookbinding machine of claim 1, wherein said clamp carriage and said cover sheet supporting means are driven by common drive means.

* * * * *